Feb. 14, 1967 P. J. ZERWES 3,304,363
JUNCTION BOX CONSTRUCTION
Filed July 20, 1964 4 Sheets-Sheet 2
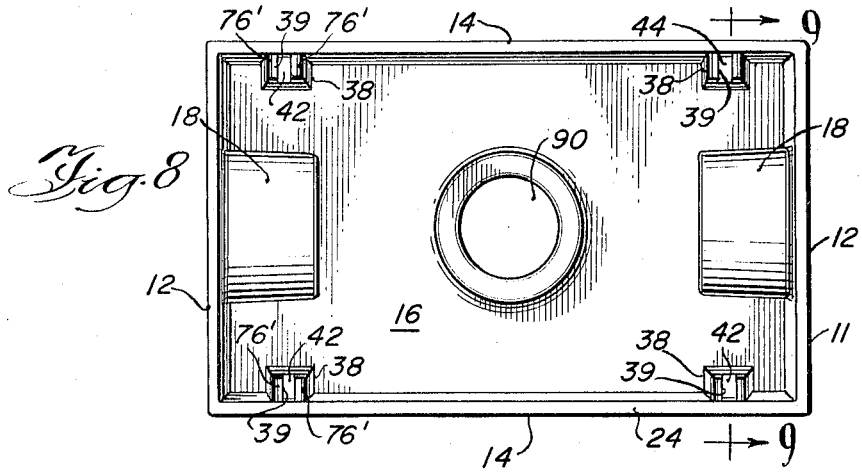
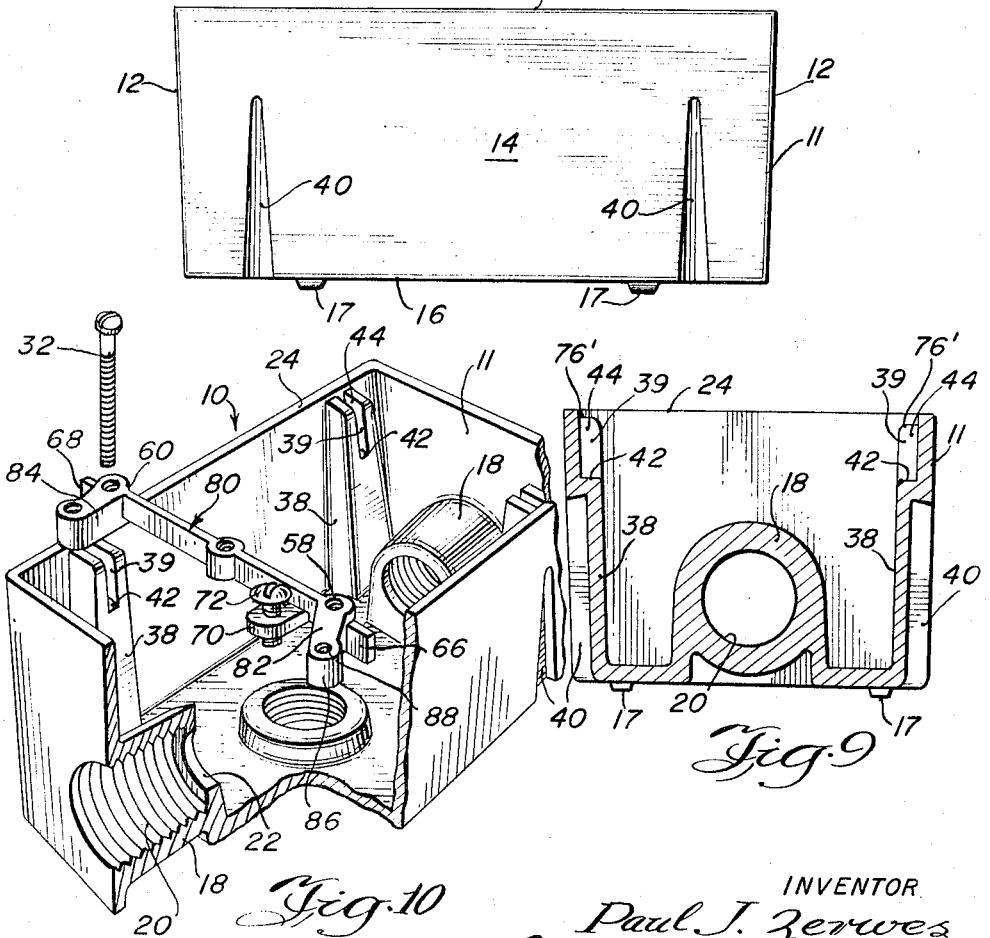
INVENTOR.
Paul J. Zerwes
By Silverman & Coss
ATTORNEYS.

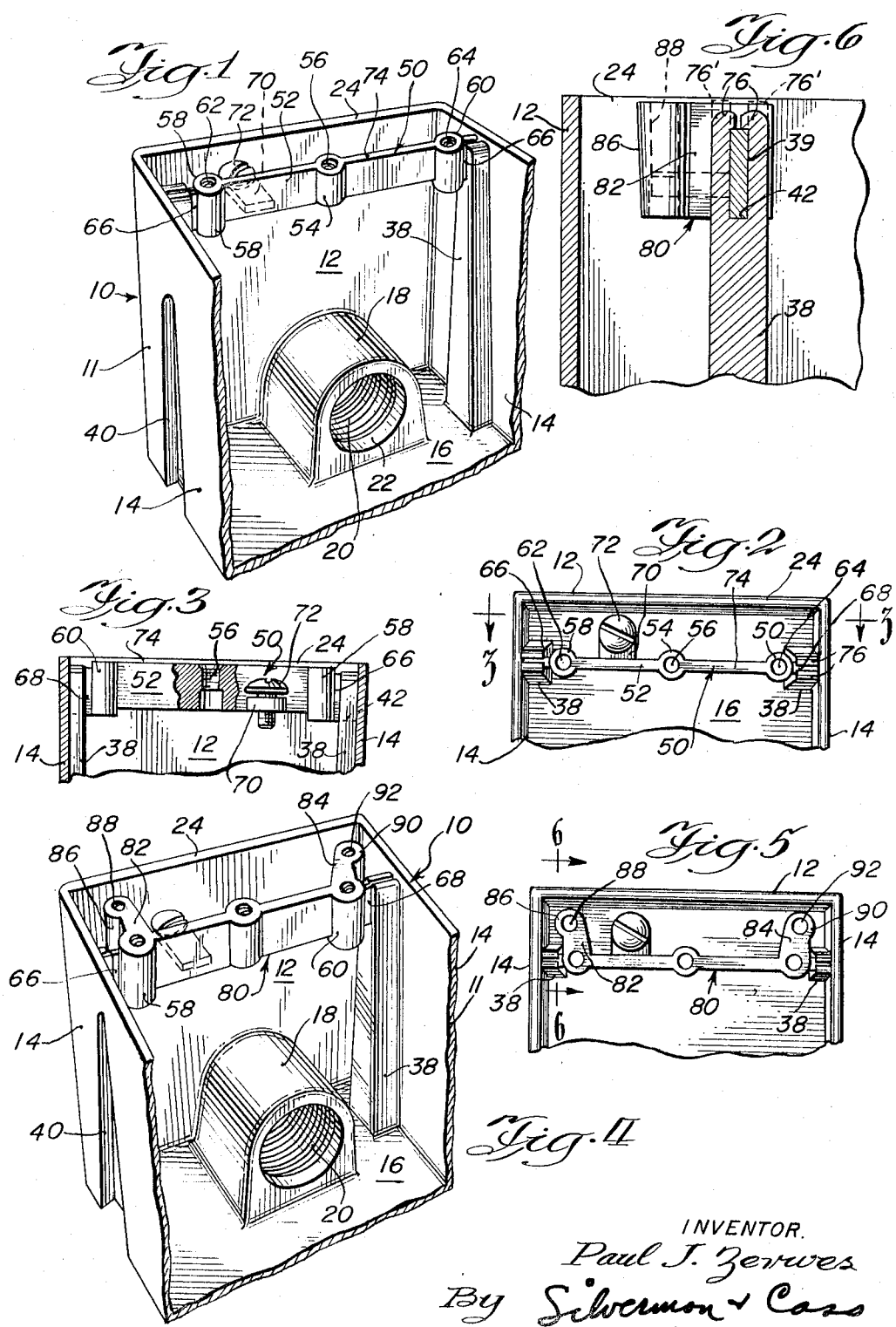

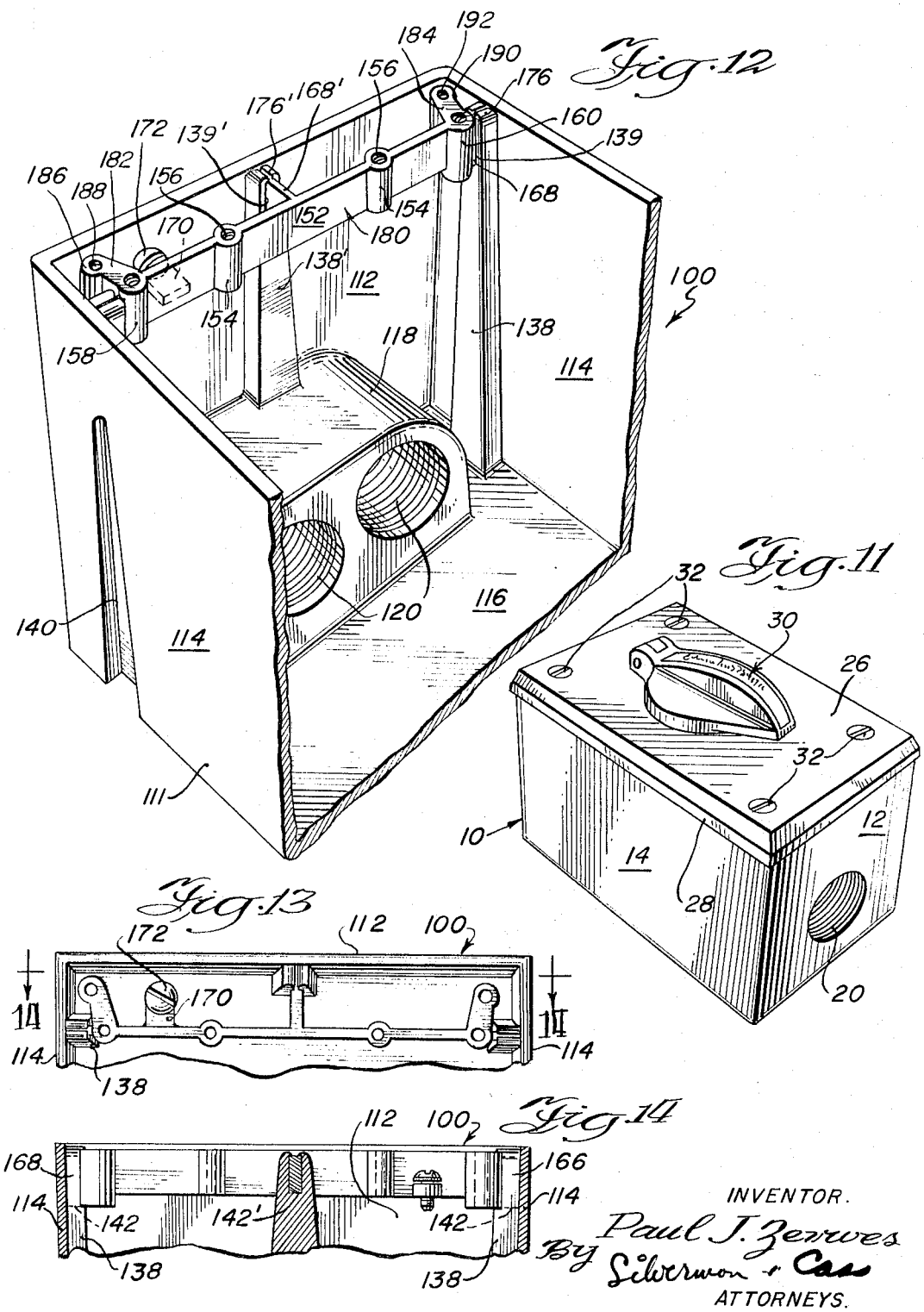

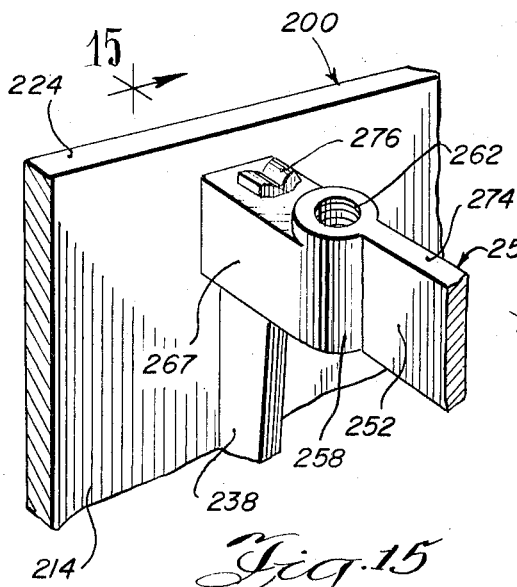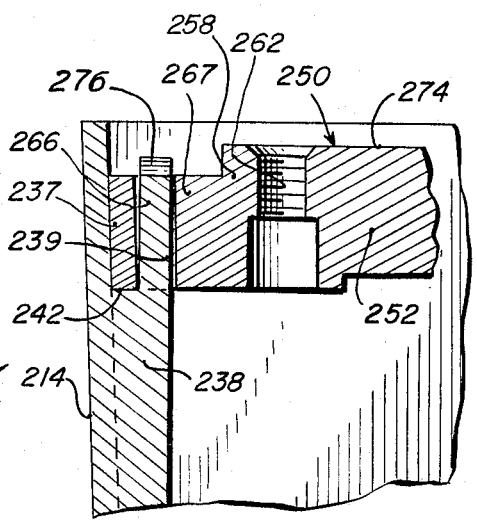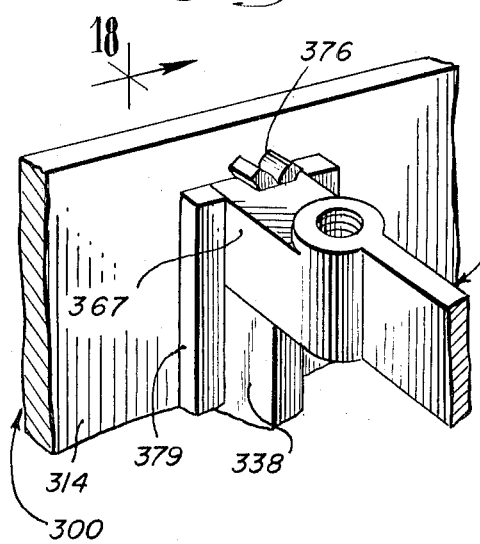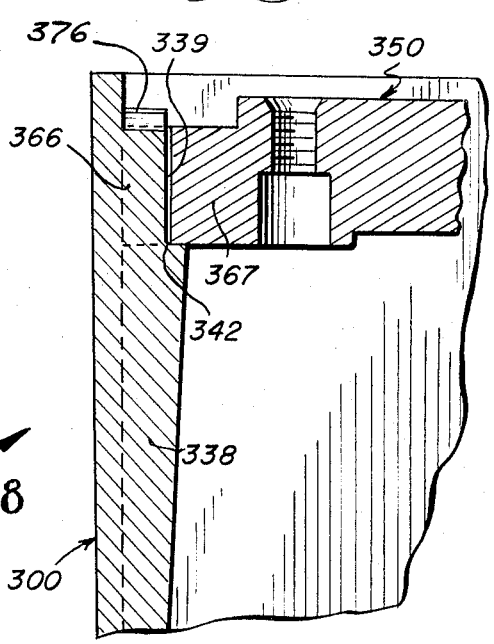

United States Patent Office 3,304,363
Patented Feb. 14, 1967

3,304,363
JUNCTION BOX CONSTRUCTION
Paul J. Zerwes, Chicago, Ill., assignor to Bell Electric
Company, Chicago, Ill., a corporation of Illinois
Filed July 20, 1964, Ser. No. 383,713
12 Claims. (Cl. 174—53)

This invention relates generally to so-called electrical junction or outlet boxes and more particularly is concerned with outlet boxes intended for use in moisture-proof installations, although not limited thereto.

Junction boxes of the general type with which the invention is concerned are usually rugged diecast aluminum housings which have several screw threaded openings adapted to receive the respective threaded ends of thin-wall steel tubing to lead electrical connections to and from the box. Such boxes are intended to enable the mounting of switches, electrical receptacles and the like, and hence are also required to have smaller threaded screw holes to enable the attachment of a variety of different kinds of plates thereto by means of screws.

Heretofore such boxes have been made as integral structures with posts diecast integral with the box and located adjacent opposite ends of the box. These posts have the threaded screw holes formed in them. During manufacture, such posts are drilled and tapped in order to provide said screw holes to receive screws to enable the attachment of various switches, fuses and the like apparatus to the box. When the box is used as a so-called standard box, it has six drilled and tapped holes, three adjacent each end wall. Since the screws which accompany the usual apparatus installed in or on the box are fairly long, it is necessary that these holes be relatively deep. Consequently, the holes cannot be cored during casting, and after the boxes have been cast, they must be drilled and tapped by hand. Breakage of taps and drills is quite common.

Another type of junction box is manufactured and available generally, and the same is known as a universal box, differing from the standard box only that it requires an additional four tapped screw holes, two adjacent each end at the corners of the box closer to the end walls than the others described, and for this purpose, a cross strap is usually added to the box carrying these holes. In order to attach the cross strap, it is necessary to stake the ends of the posts over and onto the cross strap with special tools.

An example of the type of box with which the invention is concerned is shown in U.S. Patent 2,991,327 owned by the assignee of the applicant herein. The cross strap referred to above is also shown and described in the said Patent 2,991,327.

In addition, there is normally a boss which is cast into the inside surface of the bottom wall of the box to receive a screw for attaching a grounding lug. If needed, this boss must be tapped, and further, in order to use the same, since it is at the bottom of the box, any wiring or apparatus which is installed in the box normally has to be removed in order to have access to the grounding lug.

The primary object of the invention is to provide a highly effective, lighter weight and more economical junction box, easier to manufacture and use, yet providing all the functions of the prior structures.

Still a further object of the invention is to provide a junction box of the character described in which there is a mounting bar at each end of the box, this mounting bar being separately formed and easily attached permanently to the box, the mounting bar having threaded openings, grounding lugs and the like formed therein.

Still a further object of the invention is to provide a junction box in which the mounting bar may be of different constructions to enable the box to serve either as a standard or universal junction box.

Still a further object of the invention is to provide a novel and improved junction box in which the box casting itself exclusive of the mounting bars is extremely simple requiring more economical molds than heretofore needed, and hence being easier and more economical to manufacture, stock and handle.

The junction box of the invention is made up of a plurality of parts, consisting of the box itself and the mounting bars which are attached thereto. The trend in the art of manufacture of electrical apparatus of this general field has moved toward the elimination of labor and multiple parts. It is pointed out that in the instant case, the achievement of a simpler, more economical, more rugged and more efficient junction box by making the box itself separate from the means providing the screw holes and then joining the several parts, seems to be contrary to that which would be expected. With the difference between standard and universal junction boxes being a simple matter of choosing a slightly different mounting bar, all of the advantages and attributes of the invention attach to both. This does not seem to be feasible when one notes the construction of prior standard junction boxes and that which is needed to convert same into universal boxes.

The attachment of the mounting bars to the box being a novel aspect of the invention, other objects are concerned with the provision of a simple, novel and effective connection between the mounting bar and box.

With the foregoing and other objects in view which will become more apparent to those skilled in the art as the description of the invention proceeds, preferred embodiments thereof have been illustrated in detail in the drawings and described hereinafter in the specification in order to comply with the patent laws.

In the said drawings in which like numerals apply to the same or equivalent parts throughout the several figures thereof:

FIG. 1 is a fragmentary perspective view partially in section illustrating a junction box constructed in accordance with the invention and having a type of mounting bar which constitutes the box as a standard type of junction box.

FIG. 2 is a fragmentary top plan view of the structure of FIG. 1.

FIG. 3 is a sectional view taken through the junction box of FIG. 2 along the line 3—3 and in the direction indicated.

FIG. 4 is a perspective view similar to that of FIG. 1 but showing a junction box of the so-called universal type.

FIG. 5 is a view similar to that of FIG. 2 but showing the universal box of FIG. 4.

FIG. 6 is a fragmentary sectional view taken along the line 6—6 of FIG. 5 and in the direction indicated.

FIG. 7 is a side elevational view of the box body which can be used to make the standard or universal junction boxes of FIGS. 1 to 6.

FIG. 8 is a top plan view of the box body of FIG. 7, but before installation of mounting bars.

FIG. 9 is a sectional view taken along the line 9—9 of FIG. 8 and in the direction indicated.

FIG. 10 is a fragmentary exploded perspective view of a junction box of the so called universal type in the process of assembly.

FIG. 11 is a perspective view of a junction box which may be of the construction of the invention, the same being shown with an electrical appliance and associated plate secured thereto.

FIG. 12 is a perspective view similar to that of FIG. 4 but illustrating a larger junction box requiring a longer mounting bar.

FIG. 13 is a fragmentary top plan view of one end of the junction box of FIG. 12.

FIG. 14 is a fragmentary sectional view along the line 14—14 of FIG. 13 and in the direction indicated.

FIG. 15 is a fragmentary perspective view of the junction of a mounting bar and box body illustrating a modified form of the invention.

FIG. 16 is a fragmentary sectional view taken generally along the line 16—16 of FIG. 15 and in the direction indicated.

FIG. 17 is a view similar to that of FIG. 15 but illustrating still another modified form of the invention.

FIG. 18 is a fragmentary sectional view taken generally along the line 18—18 of FIG. 17 and in the direction indicated.

Generally the invention is characterized by the provision of an integral open-top box body having pre-formed mounting bars engaged and locked in place between opposite side walls adjacent the ends of the box body. The engagement between the bar ends and the walls is effected by means of cooperating key and recess means which preferably are in the form of cooperating tongues and grooves. As will be apparent from the description which follows, in the preferred embodiment, the pre-formed bar has a tongue formed on each end theerof, while the box body is provided with grooves in opposite side walls adjacent the ends thereof. The tongues are each engaged in one of the grooves and the metal adjacent this engagement is deformed to lock each tongue in place. The grooves may each be formed in a protruding channel configuration which is cast integrally with the box body, each such configuration having deformable upper ends adapted to be swaged or bent over the bar end or tongue engaged in said grooves.

In the case that the key or male portion of the connection is provided in the walls of the box body, the bar ends will be in the form of grooves, slots or the like to cooperate with the particular form of key means provided in the box body. The tongue and groove arrangement may be reversed, for example, in which instance the bar will have grooves formed at opposite ends thereof, while the box body will have a protruding tongue in each opposite wall adjacent the respective end walls thereof.

In each case there will be a shoulder or ledge formed in the side wall at each connection to space the mounting bars relative to the bottom wall of the box. The mounting bars are provided with drilled and tapped holes for the reception of screws and each may also have a grounding lug with terminal screw engaged therein, the said lug being integral with its bar.

Looking now at the details, the reference numeral 10 designates generally a junction box constructed in accordance with the invention. The junction box body 11 is preferably diecast from suitable metal, normally an aluminum alloy which is fairly malleable. The box body 11 has end walls 12, side walls 14 and a bottom wall 16 with integrally formed feet 17. Each end wall may have one or more large threaded sockets for the reception of the threaded end of the piece of thin wall steel tubing to serve as an electrical wire conduit. The box 10 illustrated in FIGS. 1 to 11 has one such socket formed in each end wall. There is a reenforcing boss 18 integral with the bottom wall 16 and each end wall 12, having the tapped socket 20 opening to the exterior of the respective walls 12 and having the reduced diameter internal flange 22 to enable the seating of the end of a piece of thin wall tubing (not shown). The upper edge 24 of the walls 12 and 14 is adapted to have a plate such as shown at 26 in FIG. 11 engaged thereon, usually with an interposed gasket 28. The plate 26 carries some electrical appliance such as a receptacle, switch, socket or the like indicated as for example, at 30, and said plate being held upon the box 10 by means of screws 32 extending through holes in the plate 26 and the gasket 28, and engaging in threaded screw holes provided in the box 10.

As thus far described, the box 10 and its plate 26 and appliance 30 are well known. As previously mentioned, the popular form for junction boxes has had posts formed integrally with the box, these posts being drilled and tapped for the reception of the screws 32 which pass through the plate and/or appliance holes and into these screw holes. In accordance with the invention, the posts are eliminated when the box is formed. The body 11 of the box 10, which comprises the side walls 14, end walls 12 and the bottom wall 16, is formed without posts. In the embodiments illustrated in FIGS. 1 to 14, adjacent the end walls 12 there are provided inwardly extending vertically tapered columns 38, these columns commencing adjacent the top edge 24 and preferably, but not necessarily extending for the entire vertical dimension of the side walls 14. A substantial portion of the column 38 commencing at the bottom thereof may be hollow as indicated by the external recess 40, thereby lightening the box and maintaining substantially uniform thickness of all formations thereof, for more efficient die casting.

At the top end of each column 38 there is a vertical blind-end groove 39 which has a bottom shoulder or ledge 42 which may open at its top end as shown at 44 in FIGS. 8, 9, 10 to enable the engagement of the mounting bars to the box 10, one mounting bar extending transversely of the box between juxtaposed blind-end grooves 39. Each box has at least two such mounting bars, one adjacent each of the respective ends 12.

Two types of mounting bars are shown and either type may be installed or connected with the identical body 11 of the box 10 in order to convert the same either into the standard type of box or a universal type of box. One construction of mounting bar is shown in FIGS. 1 to 3 and designated 50. There is an elongate horizontally disposed metal strip 52, preferably of rectangular cross-section with the vertical dimension being the greatest to give shear strength. In the center, the bar 52 has an enlarged cylindrical boss 54 having a hole 56 passing completely through the same, at least the top portion of which is threaded. Similar cylindrical bosses are provided at 58 and 60 with screw-threaded holes at 62 and 64. All of the holes 56, 62 and 64 preferably have countersunk entrances. Integral with the end bosses 58 and 60 there are provided tongues 66 and 68. Between the center boss 54 and one of the other bosses such as, for example 58, there may be provided a horizontally arranged lug 70 integral with the bar 52 and having a terminal screw 72 engaged in a suitable threaded opening therein.

But for the screw 72, the entire mounting bar 50 preferably is formed as a die-casting. The holes 56, 62 and 64 are easily formed since they may be cored during diecasting and automatically tapped thereafter. As seen, the vertical dimension of the bar 50 is a small fraction of the total height of the box so that the length of the tapped holes is a fraction of an inch. Preferably a part of the hole only is tapped as shown in FIG. 3. The tongues 66 and 68 preferably are downwardly offset relative to the top edge 74 for a purpose presently to be described. It is desired that the top edge 74 be substantially on the same level as or slightly below the plane of the top edge 24 of the box 10.

In order to install the bar 50 the tongues 66 and 68 are engaged in the top ends 44 of juxtaposed grooves 39 and pressed home so that the bottom edges of the said tongues engage the shoulders or ledges 42. Thereafter the upper edges or lips of the columns 38 are swaged or peened over inwardly upon the top edges of the tongues 66 and 68 as shown at 76 and the installation is completed, the tongues 66 and 68 being downwardly offset to allow space for the deforming of the upper edges of columns 38 upon the tongues. This is a permanent locked-in connection and may be done automatically. The process is best understood from an examination of FIG. 6, which relates to a slightly different form of mounting bar 80. The solid lines show the peened-over ends 76. The dash lines show the ends 76' before peening.

It will be obvious that it is a simple matter to form the box 10 and likewise a relatively simple matter to form the mounting bars 50 and install the same. The box as described will be a standard box.

In order to form a so-called universal box, instead of two mounting bars 50, two mounting bars as shown at 80 are used. The universal box is shown in FIGS. 4, 5, 6 and 10. These mounting bars are substantially the same as the mounting bars 50 except that an extension is provided integral with each of the bosses 58 and 60. Thus the extension 82 is provided integral with the boss 58 while the extension 84 is integral with the boss 60. Extension 82 has a cylindrical formation 86 at its free end which is provided with a tapped hole 88 while the extension 84 has a cylindrical formation 90 at its free end provided with a tapped hole 92.

It will be seen that for a standard box the use of two mounting bars 50 will provide six tapped screw holes for receiving the screws 32 while the use of two mounting bars 80 will provide the four additional holes adjacent each of the corners of the box 10.

In FIGS. 12, 13 and 14, there is illustrated another type of box in which the width of the box is considerably greater than that of the box 10. Box 100 has the relative length of its end walls 112 compared to the length of side walls 114 greater than the same relationship between the end walls 12 and the side walls 14. Two connection sockets may be provided in each of the end walls 112, these sockets being shown at 120. Double bosses 118 may be provided with the interior configuration quite similar to that of the configuration of the interior of the bosses 18. In other respects the box 100 is formed in substantially the same manner as those previously described except that in the center of each of the end walls 112 an additional column may be provided for support of the mounting bars. Thus there are columns 138 integral with the side walls and the columns 138' integral with the end walls.

It will be obvious that for similar parts an effort has been made to use the same reference numerals as in the case of the box 10 except with the addition of the prefix "1."

As for the construction of the mounting bar 180 for use with the box 100, since this is a considerable amount longer than the bars 50 and 80 there is a center integral laterally extending tongue 168' adapted to engage in groove 139' of the column 138'. The metal strip 152 has two cylindrical enlargements 154 between its ends, suitably drilled and tapped at 156. This would provide 8 holes for a standard box and 12 holes for a universal box. The bar 180 is provided with extensions 182 and 184 and tapped holes 188 and 192 to provide the universal style. The bar 180 is installed in the same manner as previously described for bars 50 and 80. The body 111 is die cast with columns 138 and 138' having their blind-end grooves 139 and 139' open at the upper ends as at 44 in FIGS. 8, 9 and 10. The upper ends or lips of the columns 138 and 138' are disposed as shown at 76'. The tongues 166, 168 and 168' are inserted into the entrances of their respective grooves, pushed home upon the ledges 142 and 142' and the upper column ends peened over to form the locking formations 176 and 176' permanently securing the bars 180 in place.

Grounding lug 170 is provided as shown, with terminal screw 172. As mentioned, the location of this lug is ideal because it is immediately accessible without the need for digging down into the box or disassembling anything from the box.

It will be appreciated that no limitations are intended by the illustrations of only two types of box bodies 11 and 111. The center tapped socket 90 is quite common, and if not used, is plugged. The smaller junction boxes like 10 are known with two sockets 20 or outlets, as they are called, at each end. The larger junction boxes, like 100, are known with one, two and three outlets at the ends. The box bodies are all formed with sufficient draft to enable ready die-casting.

Two modified forms of the engagement between the bar ends and the box body walls are illustrated in FIGS. 15 to 18. In each case, there is a key and recess connection, this being considered a generic expression of all of the types of connection contemplated by the invention, and including pin and hole, tongue and groove, and key and key-way arrangements.

In FIGS. 15 and 16, the connection is a pin and hole connection. The box body wall 214 is a side wall, and it has an integrally cast column 238 which is bifurcated at its upper end to form a vertically extending pin or key 266 and thereby providing a vertical space 237 between itself and the side wall 214. There is a bottom ledge or shoulder 242 formed at the bottom of the bifurcation. In this embodiment, the bar 250, which will produce a standard type of junction box, has each end 267 somewhat thicker than the main strip portion 252, this being to enable a vertical hole or key-way 239 to be formed therein during die casting. In order to assemble the bar 250 to the box body 200 the key-way 239 at each end is aligned with a key 266 and the bar pushed down upon each ledge 242 which properly spaces the bar above the bottom wall of the junction box 200 (the bottom wall not shown here). This properly spaces the top edge 274 of the bar 250 relative to the top edge 224 of the box. To lock the bar 250 in place, the upper end of each key 266 is swaged, peened or staked over the top of the portion 267. This is shown at 276 as a staking operation which has split the upper end of the key 266 and bent portions over on opposite sides of the entrance of the key-way 239. Obviously there are two ends to the bar 250, only one of which is shown. The enlarged portion 258 has a tapped hole 262 similar to those previously described and for the same purposes.

In FIGS. 17 and 18, there is illustrated a form of the invention using still another type of connection between the side wall and the mounting bar. The junction box 300 has its side wall 314 provided with a vertical column 338 that has a tongue 366 and a lower shoulder or ledge 342 formed thereon. The bar 350 has a thickened end portion 367 with a vertically arranged slot 339 therein opening to the end of the bar. The bar 350 is assembled to the box by engaging the slot 339 upon the tongue 366 and pushing the bar 350 down until it rests upon the ledges 342 which will be provided on opposite sides of the box. Thereafter the upper free ends of each tongue 366 will be peened, swaged or staked to enlarge this end and lock the bar 350 in place. In FIG. 17, the free end has been staked by splitting the same, as shown at 376. Vertical ridges are cast integral with the side wall 314 as shown at 379. These will guide the movement of bar upon the tongue 366 during assembly, provide additional support for the same, and prevent possible spreading of the end 367 during the staking operation.

Various other forms of connection could be used, as for example, mortise and tenon engagement, and the like. The grooves shown in FIGS. 1 through 14 could just as easily be below the surface of the walls in which same are formed, instead of having the channel-like formation on the interior of the box bodies. In such case, either the walls will have to be thicker, or the columns such as 38 will have to protrude from the exterior of the box. This type of construction might not be acceptable to electrical contractors in the United States at this time, since there will be projections on the box surface making its installation more difficult. The construction, however, is certainly feasible as an example of the practice of the invention, and illustrates one of the many variations which are capable of being made without in any way de- What it is desired to secure by Letters Patent of the United States is:

1. A junction box for securement of an electrical appliance thereto and providing outlets for connection of electrical wires and the like to the appliance on the interior of the box, comprising an open top box body having end and side walls and a bottom wall, nad the end and side walls presenting upper edges in a plane to define the open top, means in at least one wall to enable electrical conductors to be led to the inside of the box, means in the side walls providing a vertically arranged groove in each side wall adjacent each end wall so that there is a pair of juxtaposed grooves at each end of the box, the grooves including a bottom ledge substantially spaced above the bottom wall, a pair of transversely arranged mounting bars, each having means for enabling the securement of said electrical appliance to said open top, each bar having end tongues engaged in the respective grooves of a pair and being suspended over the box interior, means locking the bars in said grooves, said means in the side walls comprising vertical columns integral with the side walls, each column having a bifurcated upper end to form one of said grooves, and said locking means comprises deformed portions of said upper ends engaged upon said tongues.

2. A structure as claimed in claim 1 in which each mounting bar is formed of a metal strip independently of said body and is arranged vertically on edge, the vertical dimension being a small fraction of the depth of the body, and the upper edge of the strip being substantially in the plane of said top.

3. A junction box for securement of an electrical appliance thereto and providing outlets for connection of electrical wires and the like to the appliance on the interior of the box, comprising an open top box body having end and side walls and a bottom wall, and the ends and side walls presenting upper edges in a plane to define the open top, means in at least one wall to enable electrical conductors to be led to the inside of the box, column means inwardly of the side walls and integral therewith comprising a vertically arranged key connected with each side wall adjacent each end wall so that there is a pair of keys at each end of the box, each side wall also having a ledge associated with each key and the ledge being substantially spaced above the bottom wall, a pair of transversely arranged mounting bars, each having means for enabling the securement of said electrical appliance to said open top, each bar having a key-way in its opposite ends, the keys and key-ways being connected, with the bar ends resting upon said ledges and the bar substantially suspended over the box interior with its upper edge substantially in the plane of the top and its bottom edge spaced above and free of the bottom wall.

4. A junction box as claimed in claim 3 in which the key is a tongue and the key-way is a groove in each instance.

5. A junction box for securement of an electrical appliance thereto and providing outlets for connection of electrical wires and the like to the appliance on the interior of the box, comprising an open top box body having end and side walls and a bottom wall, and the end and side walls presenting upper edges in a plane to define the open top, means in at least one wall to enable electrical conductors to be led to the inside of the box, means in the side walls providing a vertically arranged groove in each side wall adjacent each end wall so that there is a pair of juxtaposed grooves at each end of the box, the grooves including a bottom ledge substantially spaced above the bottom wall, a pair of transversely arranged mounting bars, each having means for enabling the securement of said electrical appliance through said open top, each bar having end tongues engaged in the respective grooves of a pair and being suspended over the box interior, means locking the bars in said grooves, said means in the side walls comprising integral inwardly protruding formations, bifurcated at their upper ends to provide said grooves, said grooves having a vertical length greater than the vertical dimensions of the tongues, so that when the tongues are fully in the grooves a remaining portion of each groove may be collapsed upon the tongue disposed therein to provide said locking means.

6. A junction box for securement of an electrical appliance thereto and providing outlets for connection of electrical wires and the like to the appliance on the interior of the box, comprising an open top box body having end and side walls and a bottom wall, and the end and side walls presenting upper edges in a plane to define the open top, means in at least one wall to enable electrical conductors to be led to the inside of the box, means in the side walls providing a vertically arranged groove in each side wall adjacent each end wall so that there is a pair of juxtaposed grooves at each end of the box, the grooves including a bottom ledge substantially spaced above the bottom wall, a pair of transversely arranged mounting bars, each having means for enabling the securement of said electrical appliance to said open top, each bar having end tongues engaged in the respective grooves of a pair and being suspended over the box interior, means locking the bars in said grooves, each mounting bar being formed of a metal strip independently of said body and arranged vertically on edge, the vertical dimension being a small fraction of the depth of the body, the upper edge of the strip being substantially in the plane of said top, and said tongues being downwardly offset relative to the remainder of the metal strip.

7. A junction box for securement of an electrical appliance thereto and providing outlets for connection of electrical wires and the like to the appliance on the interior of the box, comprising an open top box body having end and side walls and a bottom wall, and the end and side walls presenting upper edges in a plane to define the open top, means in at least one wall to enable electrical conductors to be led to the inside of the box, means in the side walls providing a vertically arranged groove in each side wall adjacent each end wall so that there is a pair of juxtaposed grooves at each end of the box, the grooves including a bottom ledge substantially spaced above the bottom wall, a pair of transversely arranged mounting bars, each having means for enabling the securement of said electrical appliance to said open top, each bar having end tongues engaged in the respective grooves of a pair and being suspended over the box interior, means locking the bars in said grooves, each mounting bar being formed of a metal strip independently of said body and arranged vertically on edge, the vertical dimension being a small fraction of the depth of the body, the upper edge of the strip being substantially in the plane of said top, each mounting bar having a plurality of tapped sockets therein to provide said means for enabling securement of an electrical appliance.

8. An open top body for use in making a junction box comprising integral end and side walls and a bottom wall and the side and end walls having a free upper edge defining said open top, means in at least one wall for connecting electrical leads to the interior of said body, a groove formed in each side wall and opening to the free edge adjacent each side wall and providing juxtaposed pairs of grooves, deformable lips at the top of each groove and a ledge in the groove spaced above the bottom wall so that a member of suitable dimension and configuration may be inserted in a pair of juxtaposed grooves engaged upon the ledges thereof, said lips being deformed upon said member to lock same in place, vertical integral columns formed on the interior of each side wall and each having a bifurcated upper end to provide a groove and ledge and associated deformable lips.

9. A junction box for securement of an electrical appliance thereto and providing outlets for connection of electrical wires and the like to the appliance on the interior of the body, comprising an open top box body having end and side walls and a bottom wall, the ends and side walls presenting upper edges in a plane to define the open top, means in at least one wall to enable electrical conductors to be led to the inside of the box, means in the side walls providing a vertically arranged key connected with each side wall adjacent each end wall so that there is a pair of keys at each end of the box, each side wall aslo having a ledge associated with each key and the ledge being substantially spaced above the bottom wall, a pair of transversely arranged mounting bars, each having means for enabling the securement of said electrical appliance to said open top, each bar having a keyway in its opposite ends, the keys and keyways being connected, with the bar ends resting upon said ledges and the bars substantially suspended over the box interior with its upper edge substantially in the plane of the top and its bottom edge spaced above and free of the bottom wall, the key in each instance being a pin spaced from the side wall but connected therewith and the keyway being a passageway through the bar end in each instance.

10. A junction box for securement of an electrical appliance thereto and providing outlets for connection of electrical wires and the like to the appliance on the interior of the box, comprising an open top box body having end and side walls and a bottom wall, and the end and side walls presenting upper edges in a plane to define the open top, means in at least one wall to enable electrical conductors to be led to the inside of the box, a pair of transversely arranged mounting members, each having means for enabling the securement of said electrical appliance to said open top, cooperable key and recess means for engaging said member with the box at each end of the box with said member suspended over the box interior, means for permanently locking said key and recess means in engaged condition, vertical columns interior of the box and parallel to side walls thereof, each said column being integral with the box and carrying one element of the said key and recess means and the member carrying the other element of said key and recess means, and said locking means comprising a deformed portion of said key and recess means arranged to block said recess.

11. A structure as claimed in claim 10 in which each column has a bifurcated upper end and said key and recess means comprises a groove defined by said bifurcated upper end and an end tongue formed on said mounting member and engaged in the respective groove.

12. A structure as claimed in claim 10 in which said key and recess means comprises a vertical tongue formed on each column at the upper end thereof substantially parallel thereto and spaced from the side wall to define a groove therebetween and a slot formed in said member adapted to receive the tongue therethrough with a portion of said member resting disposed in said groove.

References Cited by the Examiner

UNITED STATES PATENTS 2,862,045　11/1958　Dierstein et al. _____ 174—52 X
3,215,769　11/1965　Slater _____ 174—53

LEWIS H. MYERS, *Primary Examiner.*

H. W. COLLINS, *Assistant Examiner.*